United States Patent [19]
Falk

[11] Patent Number: 4,513,201
[45] Date of Patent: Apr. 23, 1985

[54] THERMOCOUPLE DETECTOR

[75] Inventor: R. Aaron Falk, Louisville, Colo.

[73] Assignee: Ball Corporation, Muncie, Ind.

[21] Appl. No.: 515,822

[22] Filed: Jul. 21, 1983

[51] Int. Cl.$^3$ .................. G01B 11/26; H01L 35/02
[52] U.S. Cl. ............................... 250/342; 250/338; 136/225; 356/141
[58] Field of Search ............... 250/342, 316.1, 330, 250/338, 370 H, 332; 356/121, 141; 136/213, 214, 225; 374/6

[56]  References Cited
U.S. PATENT DOCUMENTS

| | | | |
|---|---|---|---|
| 3,526,883 | 9/1970 | Tabor | 340/174 |
| 3,529,161 | 9/1970 | Oosthoek et al. | 250/83.3 |
| 3,545,843 | 12/1970 | Somers et al. | 350/162 |
| 3,772,518 | 11/1973 | Murayama et al. | 250/211 R |
| 3,995,159 | 11/1976 | Elliott | 250/370 |
| 4,029,962 | 6/1977 | Chapman | 250/338 |
| 4,047,037 | 9/1977 | Schlosser et al. | 250/370 |
| 4,055,765 | 10/1977 | Gerber et al. | 250/370 |
| 4,070,578 | 1/1978 | Timothy et al. | 250/336 |
| 4,114,191 | 9/1978 | Lund | 365/2 |
| 4,154,530 | 5/1979 | Connolly, Jr. et al. | 356/152 |
| 4,315,690 | 2/1982 | Trocellier et al. | 356/152 |

FOREIGN PATENT DOCUMENTS 840684  7/1960  United Kingdom ............ 250/332

OTHER PUBLICATIONS

C. Bar-Isaac and U. Korn, "Thermoelectric Line Array for Spatial Specification of Focused Laser Beams", *Applied Physics*, vol. 6, No. 2, (Mar. 1975), pp. 173–175.
Day, G. W., et al, "Detection of Fast Infrared Laser Pulses with Thin Film Thermocouples", *Applied Physics Letters*, vol. 13, No. 9, (Nov. 1, 1968), pp. 289–290.

*Primary Examiner*—Alfred E. Smith
*Assistant Examiner*—Constantine Hannaher
*Attorney, Agent, or Firm*—Gilbert E. Alberding

[57]  ABSTRACT

An apparatus for determining the direction of orientation of pulsed sources includes a detector having two rectangular arrays of thermocouple strips fixed to opposite surfaces of a substrate. Radiation from the source is restricted to be incident on only one of the rectangular arrays. The incident radiation is thermalized quickly by the first array, and a voltage differential between the two rectangular arrays is sensed. The orientation of the source with respect to the optical axis of the apparatus can be calculated from an identification of that portion of the array wherein local thermalization takes place.

12 Claims, 4 Drawing Figures

THERMOCOUPLE DETECTOR

BACKGROUND OF THE INVENTION

The present invention is directed generally to radiant energy-responsive devices which emit an electrical signal, particularly devices which would emit a signal indicative of the origin of the radiant energy. The invention is particularly related to devices capable of detecting pulse laser emissions over a wide dynamic and wavelength range which would indicate the direction of the source of the laser pulse.

Various detectors for detecting light, particularly that light emitted from lasers in pulse form, are known in the prior art. While some prior art detectors are capable of operating at room temperature, many detectors are required to be cryogenically cooled in order to be sensitive to very low-power laser emissions. Whether or not cryogenically cooled, sensors which are sensitive to very low-power laser emissions are very easily swamped and therefore do not have the capability of favorably responding over a large dynamic range. Other sensors are sensitive to large dynamic ranges in power of laser pulses, but often measure total energy flux and thus are rather slow to respond to new input information. Finally, only a small number of detectors are intended for directional sensing and connected to appropriate electronics so as to indicate the relative direction of the source of the laser pulses.

SUMMARY OF THE INVENTION

A detector according to the present invention employs a plurality of thermocouples in an array which permits X-Y sensing of the direction of the source of incident energy. Thermocouples are normally considered to be very slow detectors. This slowness is due, however, to the typical requirement to measure total energy, and the long thermal time constant of the mass to which the thermocouple is connected. In such devices, it is necessary to allow the thermal mass to come to equilibrium prior to identification or quantification of the signal.

In the present invention, it has been recognized that a small, thin thermocouple can, in appropriate circumstances, respond very quickly to an impulse of heat. In addition, when that heat is due to a laser pulse, a large local heating occurs which does not penetrate very deeply into the mass in the first few microseconds (it is this mechanism which is employed in laser welding and laser drilling). A very thin thermocouple can take advantage of this local heating and thereby amplify the thermal signal generated upon interception of a laser pulse. Furthermore, a device of this invention will be responsive over a wideband width of incident photon energy; i.e., it can be responsive to photon energy over a wide frequency range.

Accordingly, in the present invention, a detector of pulse laser emissions is constructed having two rectangular arrays of thermocouple strips fixed to opposite surfaces of a single substrate. A thermalization enhancement layer overlies the rectangular array except along the edges of the array where terminal portions are exposed of one of the two materials forming each thermocouple strip of the array. Sensing means for sensing the voltage differential between the two rectangular arrays is connected to the terminals in such a manner that the thermal coordination between the two rectangular arrays can be sensed. The output of the voltage differential sensing means is directed to an appropriate means for calculating the orientation of the energy source with respect to the detector based on appropriate geometric criteria.

The detector includes optics appropriate to collect the pulse laser emission and focus the same on one of the two rectangular arrays. Preferably, the optics should define a spot size which is scaled to the array spacing and be independent of the wave length of the incoming light. The exact design of such a system depends on the wave length region to be covered and the field of view desired to be surveyed by the sensor. The particular optics employed may be either conventional or novel and, in any event, is not the subject of the present invention.

It is important, however, that the optics define a substantially constant spot size of the light incident on the detecting array. It is also important that the array be patterned such that at least one intersecting row element and column element thermocouple will be exposed to any incident radiation which fills the incoming aperture of the optical system. The optical aperture should preferably be such as to focus the incident light as a spot having a diameter of approximately the same size as the thermal drift distance in the detector array itself. This assures adequate sensitivity to very low-power laser pulses, yet still permits the dynamic range necessary for avoiding swamping when exposed to larger-powered laser pulses.

The array itself can be constructed on any dimensionally stable substrate material. Examples of materials which might advantageously be used as a substrate are ceramic materials such as glass and polymeric materials such as polyimides. The preferred material for the substrate would depend in part on the choice of material for the thermocouple junctions. Various materials can be employed in forming junctions having known characteristics such as copper and constantan and semiconductor materials.

Additional features and advantages of the invention will become apparent to those skilled in the art upon consideration of the following detailed description of a preferred embodiment exemplifying the best mode of carrying out the invention as presently perceived. The detailed description particularly refers to the accompanying features in which:

DETAILED DESCRIPTION OF THE PREFERRED EMBODIMENTS

Figure 1:
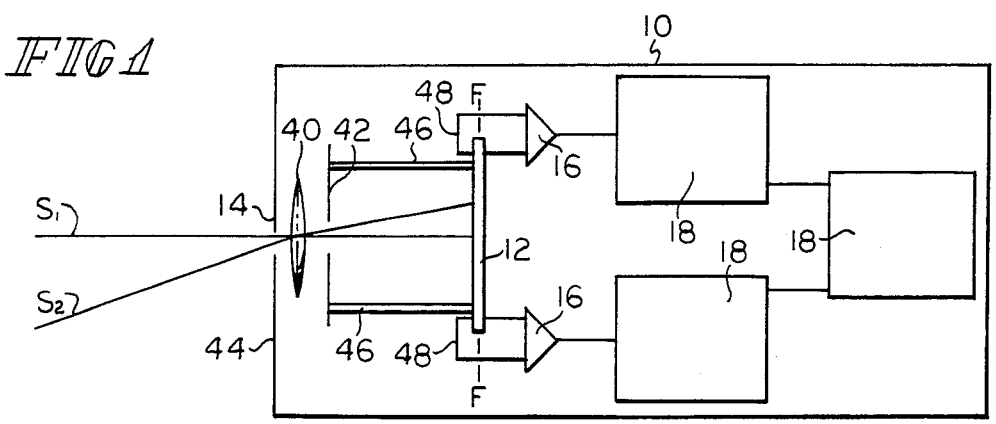
FIG. 1 is a schematic illustration of an apparatus for determining the directional orientation of a radiant energy source employing a detector of the present invention.

An apparatus 10 for determining the directional orientation of an optical source such as S1 or S2 with respect to the apparatus 10 includes a detector 12 which is described in further detail in connection with FIGS.

2, 3, and 4. The apparatus 10 also includes aperture means 14 for restricting the light incident on the detector 12 from the sources S1, S2, and the like so that each occupies only a small area on the detector 12. Sensing means 16 are provided for sensing voltage differentials between selected portions of the detector 12 and means 18 are provided for calculating the orientation of the sources S1, S2 and the like based on outputs of the sensing means 16. Such calculating means may be that used for the BASD MAMA detector or a programmed microprocessor.

Figure 2:
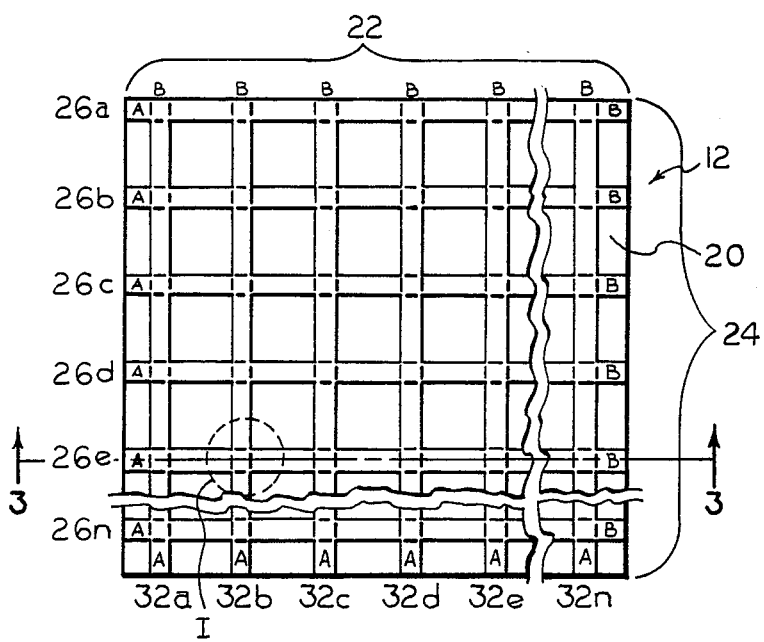
FIG. 2 is a schematic plan view of one of the rectangular arrays of thermocouple strips forming a detector of the present invention.
Figure 3:
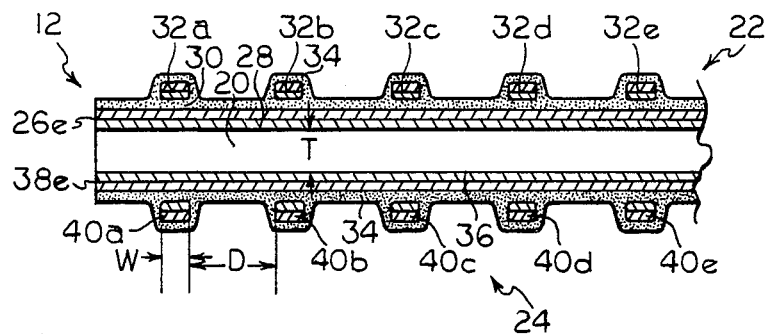
FIG. 3 is an enlarged and detailed sectional view of a portion of the detector of FIG. 2.

The detector 12 is shown diagrammatically in FIGS. 2 and 3 to include a substrate 20. Two rectangular arrays 22 and 24 of thermocouple strips are fixed to opposite surfaces of substrate 20. A first series 26 of parallel thermocouple strips are secured to the front surface 28 of substrate 20. The thermocouple strips 26 can comprise any thermocouple pair (e.g., copper and constantan) referred to as material A and material B, respectively. Near the periphery of substrate 20, the ends of strips 26 are selectively exposed such that material A is exposed on one end of one strip, while material B is exposed on the opposite end of the same strip. Adjacent strips 26 are similarly situated and their ends similarly exposed as diagrammatically shown in FIG. 2.

A layer 30 of thermalization-enhancing material is situated contiguously over the first series of strips 26. A second series of parallel thermocouple strips 32 are arranged at right angles to the first series of thermocouple strips 26. The ends of thermocouple strips 32 are, in like manner to strips 26, exposed such that material A is available for contact at one end of strip 32 while material B is available for contact at the other end of strip 32. A second thermalization layer 34 then overlies the second series of strips 32 and may extend over the entire surface of the array 22.

The array 24 on the back surface 36 of substrate 20 is configured in like manner and is preferably arranged such that thermocouple strips 38, which are arranged in rows parallel to thermocouple strips 26, are diametrically opposite each other. In like manner, thermocouple strips 40 situated on the back surface 36 of substrate 20 are also arranged diametrically opposite the thermocouple strips 32 as shown in FIG. 3. The back array 24 provides for thermal noise discrimination by responding to environmental changes in the same manner as the front array 22.

In order that the response of the various thermocouple elements be substantially identical, it is preferred that all thermocouple strips in both arrays 22 and 24 have a uniform width W and be separated by a uniform distance D. It is also preferred that the thickness T of the substrate 20 be uniform so that the thermal dispersion between surface 28 and surface 36 be uniform over the entire extent of substrate 20. The particular dimensions W, D, and T will vary and depend upon the various materials selected to form the detector 12 and the response characteristics desired from the detector itself as inputs to the subsequent sensors 16 and calculating means 18.

The aperture means 14 can include a lens 40, iris 42, and other conventional elements intended to collect the light from various sources S1, S2, and the like and with respect to each source focus the light in a focal plane F—F, the detector 12 lying approximately in that plane F—F. The various elements of the aperture means 14 are intended to focus and maintain a constant spot size I as shown in FIG. 2 with respect to each source S1, S2, etc. The diameter of the image spot I is fixed by the optics of the system to be such as would contact at least one thermocouple of each set 26,32 regardless of its position with respect to array 22. Hence, the diameter of the image should be greater than D and preferably less than D+2W. The housing 44 which encloses the apparatus 10 can include appropriate light shields 46 which prevent light from sources such as S1 and S2 from reaching the detector 12 except by way of the aperture means 14 and associated optics.

Appropriate coupling means 48 are provided for coupling the exposed terminal ends of each thermocouple strip 26, 32, 38, and 40 to a corresponding sensing means 16 for sensing any electrical potential generated by a given thermocouple strip. The strips are coupled to the sensing means 16 such that the electrical output of each thermocouple strip 26 on front array 22 is compared with the electrical output of the thermocouple strip 38 which is diametrically opposite it on back array 24. One may consider the thermocouple strips 26 of an n×n array as being serially designated 26a, 26b, 26c, . . . 26i, . . . 26n. Likewise, thermocouple strips 38 would be similarly designated in the same order 38a, 38b, 38c, . . . 38i, . . . 38n. Thermocouple strips 32 and 40 would be similarly designated. This designation is shown in FIG. 3. Hence, in a n×n array, the ith column or row of the front array 22 would be diametrically opposite the ith row and column on the back array 24.

Figure 4:
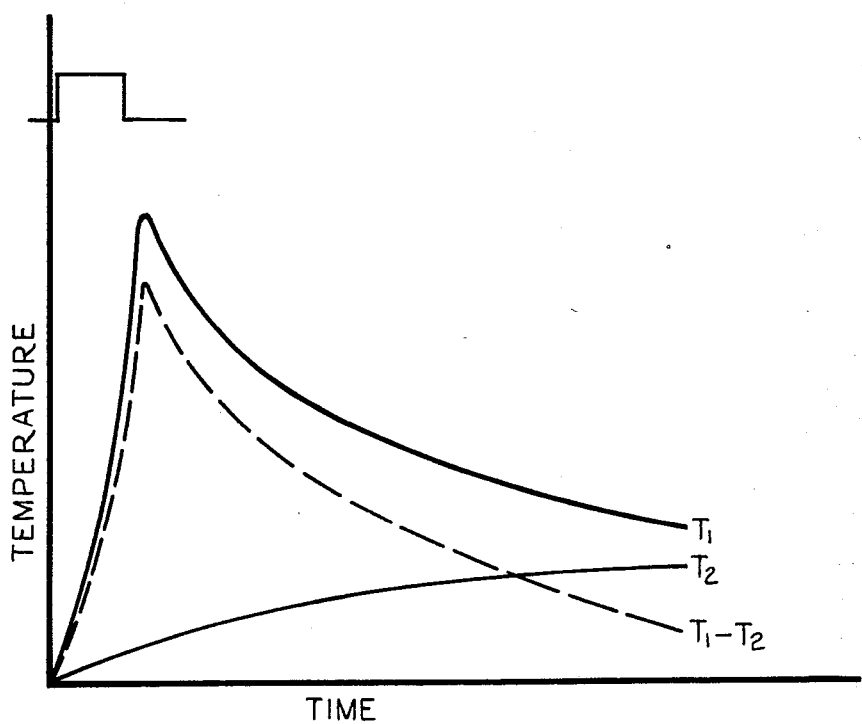
FIG. 4 is a graph showing the thermal response characteristics of two coordinate thermocouples as a function of time when subjected to an incident laser pulse.

In operation, the light from a laser pulse source S is absorbed in the thermalization-enhancing layers 30, 34 of front array 22 and converted to heat. The heat propagates into the material, causing a given thermocouple in a column such as 32b and a given thermocouple in a row such as thermocouple 26e to experience a rapid rise in temperature. This rapid rise in temperature in thermocouple 32b or 26e is shown in FIG. 4 as temperature curve T1. The square pulse shown in the upper left of FIG. 4 is intended to show the pulse length of the incident laser pulse. After the incident radiation of the laser pulse has ceased, the momentary increase in temperature begins to reverse as the heat due to the laser pulse defuses three-dimensionally into the detector 12 and substrate 20. The heat slowly propagates through the substrate, cooling the thermocouple 26e and/or 32b initially irradiated on the front array 22 and increases the temperature of the corresponding thermocouple 38e and/or 40b on the back array 24, thus giving rise to an increase in temperature given by the curve T2 in FIG. 4.

A voltage differential amplifier 16 connected to each pair of corresponding thermocouples such as 32b and 40b or 26e and 38e senses a potential difference which corresponds to the difference between the two curves T1 and T2 which is designated "T1−T2" in FIG. 4. The rapid rise of the differential T1−T2 is sufficient to be used as a trigger for further electronic computation of the row and column actuated by the particular pulse. It will be appreciated that the differential T1−T2 undergoes small order variations due to normal thermal variations in the environment. The difference shown in FIG. 4 is normally sufficiently larger than normal thermal noise as to be successfully discriminated by the subsequent computing means 18.

It will be seen by a quick review of FIG. 1 that with respect to two sources S1 and S2 which are angularly separated from each other, the images projected by those sources on detector 12 would fall in two different locations. Thus, the identification of location of such a thermal pulse with respect to detector 12 as herein described can be used together with associated conventional electronics to determine the angular orientation of a source with respect to the apparatus 10.

The means 18 for calculating the orientation of the radiation source may be a programmed microprocessor. The sensing means 16 can be a series of voltage differential amplifiers connected with the thermocouple materials of each corresponding pin of thermocouple strips; e.g., 32b and 40b and 26e and 38e. The amplifiers of the sensing means 16 are rapidly sampled in a determined order by the microprocessor to identify the location of incident energy on the detector 12. With the location of the incident energy I on the detector and the known characteristics of the optical system comprising the aperture means 14, the microprocessor 18 can calculate the direction of the source of incident energy relative to the central axis of the system.

In a preferred embodiment of the invention, the thickness T of the substrate is no greater than about the same dimension as the width W of the thermocouple strips, while the distance between the strips D is about three times the width W. Since quick response is a desirable feature of the invention, it is preferred that the cross section of the metal-forming thermocouple pair be as small as is practical. In the preferred embodiment, the width W of a thermocouple would be about $3 \times 10^{-4}$ cm, while the thickness of each metal layer forming the thermocouple would be about $1 \times 10^{-4}$ cm. Adopting these dimensions, one can see that a $100 \times 100$ array would have an overall size of less than $1\frac{1}{2}$ mm square.

Using a detector of the dimensions described and assuming that the thermocouples were copper constantan layers of the dimensions indicated, it is believed that such a detector could detect a signal delivering energy as small as $2 \times 10^{-11}$ joules per pulse even at 220° K. Were such an apparatus cooled and other materials employed, one could reasonably expect to experience an increase in the sensitivity of the device by at least an order of magnitude with a potential minimum detectable signal being about $10^{-12}$ joules per pulse.

Although the invention has been described in detail with reference to various preferred embodiments, variations and modifications exist within the scope and spirit of the invention as described and as defined in the following claims.

I claim:

1. An apparatus for determining the directional orientation of a source of radiation comprising:
   a detector having a substrate and two rectangular arrays of thermocouple strips fixed to opposite surfaces of the substrate,
   aperture means for restricting the radiation incident on the detector from a distant source to a preselected small area for one of the rectangular arrays,
   sensing means for sensing voltage differentials between the two rectangular arrays, and
   means for calculating the orientation of the source based on the sensed differential.

2. The apparatus of claim 1 further comprising means for enhancing the thermalization of incident radiation covering the rectangular arrays.

3. The apparatus of claim 1 further comprising means for preventing any radiation from being incident on the detector other than on said one array.

4. The apparatus of claim 1 further comprising means for focusing the radiation in a focal plane substantially coincident with the plane of said one array.

5. The apparatus of claim 1 further comprising means for coupling a selected thermocouple strip of each array to a corresponding sensing means.

6. An array for detecting incident radiation comprising:
   a planar substrate having two substantially parallel faces, each face having fixed thereto a first series of parallel thermocouple strips, a thermalization layer of a material enhancing the thermalization of incident radiation overlying the first series of strips, a second series of parallel thermocouple strips overlying the first series at right angles thereto, and a second thermalization layer overlying the second series of thermocouple strips.

7. The array of claim 6 wherein each of the thermocouple strips comprises a pair of lengths of dissimilar materials, one overlying the other, over substantially the entire length of the strip, one material being exposed at one end of the strip to form a first terminal and the other material being exposed at the other end to form a second terminal.

8. The array of claim 6 wherein the width of each thermocouple strip is selected to be about one-third of the distance between adjacent parallel strips.

9. An array according to claim 6 wherein the thickness of the substrate is selected to be about equal to the width of a thermocouple strip.

10. An apparatus comprising the array of claim 7 and sensing means coupled to each exposed terminal of each material of each thermocouple strip, said sensing means being adapted to detect and amplify differences in voltage between thermocouple strips that are diametrically opposed.

11. The apparatus of claim 10 wherein said sensing means are coupled to means for calculating the position of sensed voltage differentials of the array.

12. The apparatus of claim 11 wherein aperture means are provided to focus radiation and direct it upon a restricted area of the array, and said calculating means calculates the direction of incident radiation with respect to the axis of the aperture means from the position of the sensed voltage differentials of the array.

* * * * *